United States Patent
Kim et al.

(10) Patent No.: US 8,435,913 B2
(45) Date of Patent: *May 7, 2013

(54) CATALYST FOR POLYMERIZATION OF PROPYLENE AND METHOD FOR POLYMERIZATION OF PROPYLENE USING THE SAME

(75) Inventors: Eun-Il Kim, Daejon (KR); Young-Joo Lee, Inchon (KR); Hoe-Chul Jung, Seosan-si (KR); Joon-Ryeo Park, Seoul (KR)

(73) Assignee: Samsung Total Petrochemicals Co., Ltd., Chungcheongnam-do (KR)

( * ) Notice: Subject to any disclaimer, the term of this patent is extended or adjusted under 35 U.S.C. 154(b) by 152 days.

This patent is subject to a terminal disclaimer.

(21) Appl. No.: 12/532,888

(22) PCT Filed: Oct. 31, 2007

(86) PCT No.: PCT/KR2007/005463
§ 371 (c)(1),
(2), (4) Date: Sep. 24, 2009

(87) PCT Pub. No.: WO2008/133382
PCT Pub. Date: Nov. 6, 2008

(65) Prior Publication Data
US 2010/0130707 A1  May 27, 2010

(30) Foreign Application Priority Data
Apr. 25, 2007 (KR) .......................... 10-2007-0040360

(51) Int. Cl.
*B01J 31/00* (2006.01)
*B01J 27/24* (2006.01)
*C08F 4/02* (2006.01)

(52) U.S. Cl.
USPC ........... 502/167; 502/104; 502/123; 502/172; 502/200

(58) Field of Classification Search .......... 502/123, 502/134, 167, 200, 115, 124; 526/141, 215, 526/217, 220, 236
See application file for complete search history.

(56) References Cited

U.S. PATENT DOCUMENTS

| 4,952,649 | A | 8/1990 | Kioka et al. |
| 5,028,671 | A | 7/1991 | Kioka et al. |
| 7,767,614 | B2 * | 8/2010 | Kim et al. ............ 502/150 |
| 2007/0213206 | A1 * | 9/2007 | Tanase et al. ......... 502/171 |
| 2008/0064589 | A1 * | 3/2008 | Kim et al. ............ 502/150 |

FOREIGN PATENT DOCUMENTS

| EP | 461268 A1 * | 12/1991 |
| KR | 1020050053938 | 6/2005 |
| KR | 1020050068621 | 7/2005 |
| KR | 1020050070567 | 7/2005 |
| KR | 1020060027486 * | 3/2006 |
| KR | 1020060038103 | 5/2006 |
| KR | 1020040087263 * | 8/2006 |
| WO | WO2006/022244 A1 * | 3/2006 |
| WO | WO 2006022244 A1 * | 3/2006 |

OTHER PUBLICATIONS

English translation of KR1020060027486.*
English translation of KR10-2004-0087263.*
International search report dated Jan. 30, 2008 in corresponding PCT/KR2007/005463.

* cited by examiner

*Primary Examiner* — David W Wu
*Assistant Examiner* — Elizabeth Eng
(74) *Attorney, Agent, or Firm* — Young & Thompson

(57) ABSTRACT

Provided are a catalyst for polymerization of propylene and a method for polymerization of propylene using the same. Specifically, provided are a catalyst for propylene polymerization which comprises titanium tetrachloride, an internal electron donor, and dialkoxy magnesium particles, as a carrier, obtained from the reaction of a halogen compound or nitrogen-halogen compound as a reaction initiator, metal magnesium and an alcohol, and a method for propylene polymerization using the same.

4 Claims, No Drawings

CATALYST FOR POLYMERIZATION OF PROPYLENE AND METHOD FOR POLYMERIZATION OF PROPYLENE USING THE SAME

TECHNICAL FIELD

The present invention relates to a catalyst for polymerization of propylene and a method for polymerization of propylene using the same. Specifically, the present invention relates to a catalyst for polymerization of propylene, which comprises titanium tetrachloride, an internal electron donor, and dialkoxy magnesium particles, as a carrier, obtained from the reaction of a halogen compound or nitrogen-halogen compound as a reaction initiator, metal magnesium and an alcohol, and to a method for propylene polymerization using the same.

BACKGROUND ART

There are many methods, well known in the art, for preparing catalysts and electron donors, which can produce polypropylene polymers having high stereoregularity.

For example, U.S. Pat. No. 4,952,649 discloses a method for producing high stereoregular polypropylene with the isotacticity index (weight % of xylene insoluble part) of 96~98%, by forming recrystallized solid catalyst particles from the reaction of magnesium chloride dissolved in 2-ethylhexyl alcohol with titanium tetrachloride and dialkyl phthalate at −20~130° C., and using the resulted solid catalyst particles with triethyl aluminum as a cocatalyst and various types of alkoxy silanes as an external electron donor in bulk polymerization.

Further, according to U.S. Pat. No. 5,028,671, a method for preparing high stereoregular polypropylene with the isotacticity index of 97~98% is disclosed, which method uses a mixture of a spherical solid catalyst, triethyl aluminum as a cocatalyst, and dialkyldimethoxy silane as an external electron donor, wherein the spherical catalyst is obtained by reacting a spherical ethanol-containing magnesium chloride carrier, which has been prepared by spray drying, with titanium tetrachloride and dialkyl phthalate.

The polypropylene prepared by the above-said methods shows high stereoregularity to a certain extent, however its activity is 30 kg-PP/g-cat or less which is considered to be not sufficient for the preparation of polypropylene having reduced catalyst residues as an environmentally-friendly material.

DISCLOSURE OF INVENTION

Technical Problem

The object of the present invention is to provide a catalyst for polymerization of propylene having high polymerization activity, which comprises titanium tetrachloride, an internal electron donor and dialkoxy magnesium particles, as a carrier, obtained from a reaction of a halogen compound or nitrogen-halogen compound as a reaction initiator, metal magnesium and an alcohol, and to a method for propylene polymerization which can produce polypropylene with high stereoregularity by using the said catalyst.

Technical Solution

The catalyst for propylene polymerization according to the present invention is characterized by comprising a carrier, titanium tetrachloride and an internal electron donor, wherein the carrier is comprised of dialkoxy magnesium particles obtained by reacting metal magnesium with an alcohol, in the presence of a reaction initiator, a halogen compound or nitrogen-halogen compound.

The dialkoxy magnesium carrier, contained in a catalyst for propylene polymerization of the present invention, is obtained by reacting metal magnesium with an alcohol, in the presence of a reaction initiator, a halogen compound or nitrogen-halogen compound.

Regarding the catalyst for propylene polymerization of the present invention, the metal magnesium particles used in the preparation of the dialkoxy magnesium carrier is not strictly limited by its shape, however, it is preferred to have an average particle diameter of 10~300 μm in a powdered form, more preferably of 50~200 μm in a powdered form. When the average particle diameter of the metal magnesium is less than 10 μm, the average particle size of a carrier becomes too fine, disadvantageously. However, when it is more than 300 μm, it is not preferred since the average particle size of a carrier becomes too big and the spherical shape thereof is not uniformly hardly formed.

Regarding the catalyst for propylene polymerization of the present invention, the reaction initiator used in the preparation of said dialkoxy magnesium carrier is, for example, a halogen compound or nitrogen-halogen compound. As for the halogen compound as a reaction initiator, preferably used are, for example: halogen molecules such as $I_2$, $Br_2$, IBr and the like; alkyl halide compounds such as $CH_3I$, $CH_3Br$, $CH_3CH_2Br$, $BrCH_2CH_2Br$ and the like; acyl halide compounds such as $CH_3COCl$, PhCOCl, $Ph(COCl)_2$ and the like; aluminum halide compounds represented as a general formula $AlCl_m(OR)_{3-m}$, wherein R is a hydrocarbon group having 1-10 carbon atoms, and m is a natural number of 1~3; silicon halide compounds represented as a general formula $SiCl_n(OR)_{4-n}$, wherein R is a hydrocarbon group having 1-10 carbon atoms, and n is a natural number of 1~4; or metal halide compounds such as LiCl, LiBr, $CaCl_2$, $MgCl_2$, $MgBr_2$, $MgI_2$ and the like, and more preferably used are halogen molecules, alkyl halide compounds or metal halide compounds.

As examples of a nitrogen-halogen compound as a reaction initiator, the following (1)~(4) may be mentioned:

(1) N-halide Succinimides

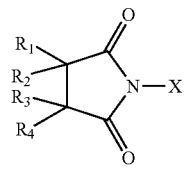

wherein, X is a halogen atom, and $R_1$, $R_2$, $R_3$ and $R_4$ are independently hydrogen or $C_{1-12}$ alkyl or $C_{6-20}$ aryl;

(2) Trihaloisocyanuric Acid Compounds

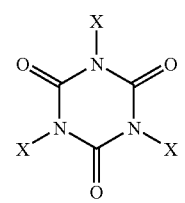

wherein, X is a halogen atom;

(3) N-Halophthalimide Compounds

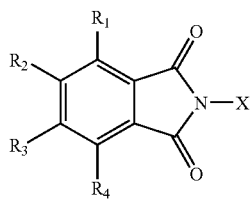

wherein, X is a halogen atom, and $R_1$, $R_2$, $R_3$ and $R_4$ are independently hydrogen or $C_{1\sim12}$ alkyl or $C_{6\sim20}$ aryl;

(4) Hydantoin Compounds

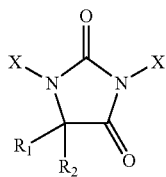

wherein, X is a halogen atom, and $R_1$ and $R_2$ are independently hydrogen or $C_{1\sim12}$ alkyl or $C_{6\sim20}$ aryl.

The halogen compound or nitrogen-halogen compound used in the preparation of said dialkoxy magnesium carrier is preferably used at the amount of 0.001~0.2 parts by weight, based on 1 part by weight of the metal magnesium. When the amount is less than 0.001 parts by weight, the reaction rate is too slow, whereas when it is more than 0.2 parts by weight, the particle size of the resulted product becomes excessively large, or a large amount of microparticles would be produced, unpreferably.

According to the catalyst for propylene polymerization of the present invention, the alcohol used in the preparation of said dialkoxy magnesium carrier is preferably one or two species of alcohol, used alone or as a mixture, selected from aliphatic alcohols represented by a general formula ROH, wherein R is a $C_{1\sim6}$ alkyl group, such as methanol, ethanol, n-propanol, isopropanol, n-butanol, isobutanol, n-pentanol, isopentanol, neo-pentanol, cyclopentanol, cyclohexanol and the like, or aromatic alcohols such as phenol. More preferably, one or two species of alcohol selected from methanol, ethanol, propanol or butanol are used alone or as a mixture. Among them, ethanol is most preferably used.

The alcohol is used at the amount of 5~50 parts by weight, based on 1 part by weight of the metal magnesium, and more preferably at the amount of 7~20 parts by weight. When the amount of alcohol is less than 5 parts by weight, the viscosity of slurry becomes significantly increased, obstructing uniform stirring of the slurry, whereas when it is more than 50 parts by weight, it causes problems such that the bulk density of the resulting carrier becomes significantly decreased, or the particle surface thereof becomes rough.

When preparing said dialkoxy magnesium carrier, the reaction of metal magnesium with an alcohol, in the presence of a reaction initiator, i.e., either of a halogen compound or nitrogen-halogen compound, is preferably conducted at the temperature of 60~110° C., and more preferably at 70~90° C. The reaction may be also conducted under reflux at the boiling temperature of an alcohol. When the reaction temperature is less than 60° C., the reaction becomes too slow, whereas when it is more than 110° C., it is not preferable since the reaction occurs too suddenly, leading to rapid increase in the amount of microparticles, and further particles are aggregated, which makes it impossible to obtain a uniform spherical carrier in a desired size.

The catalyst for propylene polymerization of the present invention can be prepared by primarily reacting the above-obtained dialkoxy magnesium carrier in a uniform spherical particle form with a titanium tetrachloride compound in the presence of an organic solvent so as to substitute the alkoxy group in the dialkoxy magnesium with a halogen group, and then reacting the resultant product with titanium tetrachloride and an internal electron donor at a temperature in the range of 0~130° C., in the presence of an organic solvent.

Examples of an organic solvent which can be used in the preparation of a catalyst of the present invention may include aliphatic hydrocarbons or aromatic hydrocarbons having 6-12 carbon atoms, and more preferably saturated aliphatic hydrocarbons or aromatic hydrocarbons having 7~10 carbon atoms. As specific examples, octane, nonane, decane or toluene, xylene and the like may be mentioned.

As for the examples of an internal electron donor used in the preparation of a catalyst of the present invention, one or more selected from diesters, particularly, aromatic diesters, more particularly, phthalic acid diesters and derivatives thereof, and benzoate and derivatives thereof are preferred. As for the suitable examples of phthalic acid diesters, one or mixtures of two or more compounds selected from the compounds represented by the following general formula may be used. For specific examples, dimethylphthalate, diethylphthalate, di-n-propylphthalate, diisopropylphthalate, di-n-butylphthalate, diisobutylphthalate, di-n-pentylphthalate, di(2-methylbutyl)phthalate, di(3-methylbutyl)phthalate, dineopentylphthalate, di-n-hexylphthalate, di(2-methylpentyl)phthalate, di(3-methylpentyl)phthalate, diisohexylphthalate, dineohexylphthalate, di(2,3-dimethylbutyl)phthalate, di-n-heptylphthalate, di(2-methylhexyl)phthalate, di(2-ethylpentyl)phthalate, diisoheptylphthalate, dineoheptylphthalate, di-n-octylphthalate, di(2-methylheptyl)phthalate, diisooctylphthalate, di(3-ethylhexyl)phthalate, dineohexylphthalate, di-n-heptylphthalate, diisoheptylphthalate, dineoheptylphthalate, di-n-Octylphthalate, diisooctylphthalate, di-neooctylphthalate, di-n-nonylphthalate, diisononylphthalate, di-n-decylphthalate, diiosdecylphthalate and the like may be mentioned:

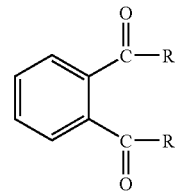

wherein, R is a $C_{1\sim10}$ alkyl group.

Regarding the catalyst for propylene polymerization of the present invention, the contacting and reaction of each component as mentioned above are preferably effected in a reactor equipped with a stirrer, which has been dried sufficiently, in an inert atmosphere.

The contacting of dialkoxy magnesium with titanium tetrachloride is preferably carried out as being suspended in an aliphatic or aromatic solvent at 0~50° C., and more preferably at a temperature in the range of 10~30° C. If the contacting temperature is out of said range, the shape of the resulting carrier particles is broken, causing a problem such that a large number of microparticles are produced. The amount of titanium tetrachloride used at this time is preferably 0.1~10 parts by weight, based on 1 part by weight of dialkoxy magnesium, and more preferably 0.3~2 parts by weight. It is preferred that the addition of titanium tetrachloride is gradually carried out over 30 minutes to 3 hours. Completing the addition, the temperature is raised gradually to 40~80° C. to finish the reaction.

The mixture in a slurry form obtained by completing the reaction, is washed once or more and added with titanium tetrachloride, and the temperature is raised to 90~130° C. for aging. The amount of titanium tetrachloride used at this stage is preferably 0.5~10 parts by weight, based on 1 part by weight of the initially used dialkoxy magnesium, and more preferably 1~5 parts by weight.

Regarding this, the rate of raising temperature is not so important in the process, however, it should be noted that during the temperature rise, an internal electron donor has to be added. At this time, although the temperature and the number of times the internal electron donor is added are not strictly limited, the total amount of the internal electron donor used is preferably 0.1~1.0 part by weight, based on 1 part by weight of dialkoxy magnesium used in the above process. When the total amount of an internal electron donor is out of this range, the polymerization activity of the resulted catalyst or the stereoregularity of the resulted polymer would be decreased.

The mixture slurry obtained after completion of the reaction, is subjected to the third contact with titanium tetrachloride, then a washing process using an organic solvent, and a drying process, obtaining the desired product, a catalyst for propylene polymerization. The condition of the third contact with titanium tetrachloride is as same as the second contact condition.

The catalyst for propylene polymerization prepared by the above method, contains magnesium, titanium, silicon, an electron donating compound and a halogen atom, wherein the amount of each component, although it is not specifically limited, is preferably 20~30 wt % of magnesium, 1~10 wt % of titanium, 0.1~5 wt % of silicon, 5~20 wt % of an electron donating compound and 40~70 wt % of a halogen atom.

A propylene polymerization method of the present invention includes polymerization of propylene through bulk polymerization, slurry polymerization or gas phase polymerization, in the presence of the catalyst for propylene polymerization prepared as above according to the present invention, alkyl aluminum as a cocatalyst and an external electron donor.

The alkyl aluminum is a compound represented by a general formula $AlR^1_3$, wherein $R^1$ is a $C_{1-4}$ alkyl group, and specifically, for example, trimethyl aluminum, triethyl aluminum, tripropyl aluminum, tributyl aluminum, triisobutyl aluminum and the like may be used.

The external electron donor is a compound represented by a general formula $R^2_m Si(OR^3)_{4-m}$, wherein $R^2$ is a $C_{1-10}$ alkyl group or cycloalkyl group, or a $C_{6-20}$ aryl group; $R^3$ is a $C_{1-3}$ alkyl group; and m is 1 or 2, and specifically, it includes, for example, $n\text{-}C_3H_7Si(OCH_3)_3$, $(n\text{-}C_3H_7)_2Si(OCH_3)_2$, $i\text{-}C_3H_7Si(OCH_3)_3$, $(i\text{-}C_3H_7)_2Si(OCH_3)_2$, $n\text{-}C_4H_9Si(OCH_3)_3$, $(n\text{-}C_4H_9)_2Si(OCH_3)_2$, $i\text{-}C_4H_9Si(OCH_3)_3$, $(i\text{-}C_4H_9)_2Si(OCH_3)_2$, $t\text{-}C_4H_9Si(OCH_3)_3$, $(t\text{-}C_4H_9)_2Si(OCH_3)_2$, $n\text{-}C_5H_{11}Si(OCH_3)_3$, $(n\text{-}C_5H_{11})_2Si(OCH_3)_2$, (cyclopentyl)$Si(OCH_3)_3$, (cyclopentyl)$_2Si(OCH_3)_2$, (cyclopentyl)(CH$_3$)$Si(OCH_3)_2$, (cyclopentyl)(C$_2$H$_5$)$Si(OCH_3)_2$, (cyclopentyl)(C$_3$H$_7$)$Si(OCH_3)_2$, (cyclohexyl)$Si(OCH_3)_3$, (cyclohexyl)$_2Si(OCH_3)_2$, (cyclohexyl)(CH$_3$)$Si(OCH_3)_2$, (cyclohexyl)(C$_2$H$_5$)$Si(OCH_3)_2$, (cyclohexyl)(C$_3$H$_7$)$Si(OCH_3)_2$, (cycloheptyl)$Si(OCH_3)_3$, (cyclocycloheptyl)$_2Si(OCH_3)_2$, (cyclocycloheptyl)(CH$_3$)$Si(OCH_3)_2$, (cyclocycloheptyl)(C$_2$H$_5$)$Si(OCH_3)_2$, (cyclocycloheptyl)(C$_3$H$_7$)$Si(OCH_3)_2$, $PhSi(OCH_3)_3$, $Ph_2Si(OCH_3)_2$, wherein Ph is a phenyl group, $n\text{-}C_3H_7Si(OC_2H_5)_3$, $(n\text{-}C_3H_7)_2Si(OC_2H_5)_2$, $i\text{-}C_3H_7Si(OC_2H_5)_3$, $(i\text{-}C_3H_7)_2Si(OC_2H_5)_2$, $n\text{-}C_4H_9Si(OC_2H_5)_3$, $(n\text{-}C_4H_9)_2Si(OC_2H_5)_2$, $i\text{-}C_4H_9Si(OC_2H_5)_3$, $(i\text{-}C_4H_9)_2Si(OC_2H_5)_2$, $t\text{-}C_4H_9Si(OC_2H_5)_3$, $(t\text{-}C_4H_9)_2Si(OC_2H_5)_2$, $n\text{-}C_5H_{11}Si(OC_2H_5)_3$, $(n\text{-}C_5H_{11})_2Si(OC_2H_5)_2$, (cyclopentyl)$Si(OC_2H_5)_3$, (cyclopentyl)$_2Si(OC_2H_5)_2$, (cyclopentyl)(CH$_3$)$Si(OC_2H_5)_2$, (cyclopentyl)(C$_2$H$_5$)$Si(OC_2H_5)_2$, (cyclopentyl)(C$_3$H$_7$)$Si(OC_2H_5)_2$, (cyclohexyl)$Si(OC_2H_5)_3$, (cyclohexyl)$_2Si(OC_2H_5)_2$, (cyclohexyl)(CH$_3$)$Si(OC_2H_5)_2$, (cyclohexyl)(C$_2$H$_5$)$Si(OC_2H_5)_2$, (cyclohexyl)(C$_3$H$_7$)$Si(OC_2H_5)_2$, (cycloheptyl)$Si(OC_2H_5)_3$, (cycloheptyl)$_2Si(OC_2H_5)_2$, (cycloheptyl)(CH$_3$)$Si(OC_2H_5)_2$, (cycloheptyl)(C$_2$H$_5$)$Si(OC_2H_5)_2$, (cycloheptyl)(C$_3$H$_7$)$Si(OC_2H_5)_2$, (phenyl)$Si(OC_2H_5)_3$, (phenyl)$_2Si(OC_2H_5)_2$ and the like.

In the propylene polymerization method of the present invention, the suitable ratio of a cocatalyst, alkyl aluminum to a catalyst of the present invention can be represented by a molar ratio of aluminum atoms in a cocatalyst to titanium atoms in a catalyst. The molar ratio of aluminum atoms in a cocatalyst to titanium atoms in a catalyst, although it may vary to some extent depending on the polymerization method employed, is preferably 1~1000 and more preferably 10~300. When the ratio of alkyl aluminum to a catalyst is out of the said range, it is not preferable because the polymerization activity becomes decreased.

In the propylene polymerization method of the present invention, the suitable ratio of an external electron donor to a catalyst of the present invention can be represented by a molar ratio of silicon atoms in an external electron donor to titanium atoms in a catalyst, and it is preferably 1~200 and more preferably 10~100. When the molar ratio of an external donor to a catalyst of the present invention is less than 1, stereoregularity of the resulted polypropylene polymer is significantly lowered, whereas when it is more than 200, polymerization activity of a catalyst is remarkably decreased.

MODE FOR THE INVENTION

Hereinafter, the present invention will be further illustrated through examples and comparative example, however it should be understood that the scope of the present invention is not limited by those examples.

Example 1

Catalyst Preparation

To a 5 L-volume ceramic reactor equipped with a stirrer, an oil heater and a reflux condenser, which was sufficiently purged with nitrogen, 1.65 g of N-chlorosuccinimide, 15 g of metal magnesium of which average particle diameter is 100 μm (as a powdered product) and 240 ml of anhydrous ethanol were added. The temperature of the reactor was raised to 78° C. so as to maintain the ethanol to be refluxed, while stirring at 240 rpm. After 5 minutes, hydrogen was generated upon start of a reaction, therefore an outlet of the reactor was maintained open so as to exhaust the generated hydrogen, thereby maintaining the pressure inside the reactor as atmospheric pressure. When the hydrogen generation is completed, 15 g of metal magnesium, that is a powder-formed product of which average particle diameter is 100 μm, and 240 ml of ethanol were added by 3 portions every 20 minutes. After completing the addition of said metal magnesium and ethanol, the reactor temperature and stirring rate were maintained as a reflux condition for 2 hours (aging). Finishing the aging process, the resultant was washed three times at 50° C., with 2,000 ml of n-hexane per each washing. The washed product was dried for 24 hours under a nitrogen flow, thereby obtaining 270 g of a solid product with good flowability, which was diethoxy magnesium (yield 96%). The prepared diethoxy magnesium had a spherical shape with the average particle diameter of 37 μm, 0.78 of a particle size distribution index, and 0.32 g/cc of a bulk density.

To a 1 L-volume glass reactor equipped with a stirrer, of which atmosphere was sufficiently substituted with nitrogen, 150 ml of toluene and 25 g of diethoxy magnesium prepared above were added and maintained at 10° C. Thereto, 25 ml of titanium tetrachloride which were diluted with 50 ml of toluene were added over 1 hour, and then the temperature of the reactor was elevated to 60° C. at a rate of 0.5° C. per minute. The reaction mixture was maintained at 60° C. for 1 hour. By stopping stirring, the mixture was maintained still, until a solid product was precipitated, so as to remove the supernatant, and then washed the remained mixture once by stirring the mixture again for 15 minutes with the addition of 200 ml of fresh toluene, stopping stirring, allowing it to stand, and removing the supernatant.

To the solid product treated with titanium tetrachloride, 150 ml of toluene were added, and stirred at 250 rpm while maintaining the temperature at 30° C. as well as adding 50 ml of titanium tetrachloride thereto over 1 hour at a constant speed. Completing the addition of titanium tetrachloride, 2.5 ml of diisobutyl phthalate were further added, and the temperature of the reactor was elevated to 110° C. at a constant rate over 80 minutes, i.e. at a rate of 1° C. per minute. While the temperature elevation, at each time the reactor temperature reached to 40° C. and 60° C., 2.5 ml of diisobutyl phthalate were additionally added. The temperature was maintained at 110° C. for 1 hour and lowered to 90° C.; stirring was stopped; the supernatant was removed; and the resulted mixture was washed once by adding 200 ml of toluene additionally with stirring, allowing it to stand, and removing the supernatant. Thereto 150 ml of toluene and 50 ml of titanium tetrachloride were added, the temperature was raised to 110° C., and the temperature was maintained for 1 hour. Said slurry mixture after completion of the aging process was washed twice with 200 ml of toluene per each wash, and washed 5 times with 200 ml of n-hexane per each wash at 40° C., thereby obtaining a pale-yellow catalyst. A titanium content of the resulted catalyst dried under a nitrogen stream for 18 hours was 2.70 wt %.

Example 2

Catalyst Preparation

To a 5 L-volume ceramic reactor equipped with a stirrer, an oil heater and a reflux condenser, which was sufficiently purged with nitrogen, 2.2 g of N-chlorophthalimide, 15 g of metal magnesium of which average particle diameter is 100 μm (as a powdered product) and 240 ml of anhydrous ethanol were added. The temperature of the reactor was raised to 78° C. so as to maintain the ethanol to be refluxed, while stirring at 240 rpm. After 5 minutes, hydrogen was generated upon start of a reaction, therefore an outlet of the reactor was maintained open so as to exhaust the generated hydrogen, thereby maintaining the pressure inside the reactor as atmospheric pressure. When the hydrogen generation is completed, 15 g of metal magnesium, that is a powder-formed product of which average particle diameter is 100 μm, and 240 ml of ethanol were added by 3 portions every 20 minutes.

After completing the addition of said metal magnesium and ethanol, the reactor temperature and stirring rate were maintained as a reflux condition for 2 hours (aging). Finishing the aging process, the resultant was washed three times at 50° C., with 2,000 ml of n-hexane per each washing. The washed product was dried for 24 hours under a nitrogen flow, thereby obtaining 267 g of a solid product with good flowability, which was diethoxy magnesium (yield 94.5%). The prepared diethoxy magnesium had a spherical shape with the average particle diameter of 28 μm, 0.75 of a particle size distribution index, and 0.33 g/cc of a bulk density.

To a 1 L-volume glass reactor equipped with a stirrer, of which atmosphere was sufficiently substituted with nitrogen, 150 ml of toluene and 25 g of diethoxy magnesium prepared above were added and maintained at 10° C. Thereto, 25 ml of titanium tetrachloride which were diluted with 50 ml of toluene were added over 1 hour, and then the temperature of the reactor was elevated to 60° C. at a rate of 0.5° C. per minute. The reaction mixture was maintained at 60° C. for 1 hour. By stopping stirring, the mixture was maintained still, until a solid product was precipitated, so as to remove the supernatant, and then washed the remained mixture once by stirring the mixture again for 15 minutes with the addition of 200 ml of fresh toluene, stopping stirring, allowing it to stand, and removing the supernatant.

To the solid product treated with titanium tetrachloride, 150 ml of toluene were added, and stirred at 250 rpm while maintaining the temperature at 30° C. as well as adding 50 ml of titanium tetrachloride thereto over 1 hour at a constant speed. Completing the addition of titanium tetrachloride, 2.5 ml of diisobutyl phthalate were further added, and the temperature of the reactor was elevated to 110° C. at a constant rate over 80 minutes, i.e. at a rate of 1° C. per minute. While the temperature elevation, at each time the reactor temperature reached to 40° C. and 60° C., 2.5 ml of diisobutyl phthalate were additionally added. The temperature was maintained at 110° C. for 1 hour and lowered to 90° C.; stirring was stopped; the supernatant was removed; and the resulted mixture was washed once again with 200 ml of toluene by the same method. Thereto 150 ml of toluene and 50 ml of titanium tetrachloride were added, the temperature was raised to 110° C., and the temperature was maintained for 1 hour. Said slurry mixture, after completion of the aging process, was washed twice with 200 ml of toluene per each wash, and washed 5 times with 200 ml of n-hexane per each wash at 40° C., thereby obtaining a pale-yellow catalyst. A titanium content of the resulted catalyst dried under a nitrogen stream for 18 hours was 2.83 wt %.

Example 3

Catalyst Preparation

To a 5 L-volume ceramic reactor equipped with a stirrer, an oil heater and a reflux condenser, which was sufficiently purged with nitrogen, 2.2 g of N-bromosuccinimide, 15 g of metal magnesium of which average particle diameter is 100 μm (as a powdered product) and 240 ml of anhydrous ethanol were added. The temperature of the reactor was raised to 78° C. so as to maintain the ethanol to be refluxed, while stirring at 240 rpm. After 5 minutes, hydrogen was generated upon start of a reaction, therefore an outlet of the reactor was maintained open so as to exhaust the generated hydrogen, thereby maintaining the pressure inside the reactor as atmospheric pressure. When the hydrogen generation is completed, 15 g of metal magnesium, that is a powder-formed product of which average particle diameter is 100 μm, and 240 ml of ethanol were added by 3 portions every 20 minutes. After completing the addition of said metal magnesium and ethanol, the reactor temperature and stirring rate were maintained as a reflux condition for 2 hours (aging). Finishing the aging process, the resultant was washed three times at 50° C., with 2,000 ml of n-hexane per each washing. The washed product was dried for 24 hours under a nitrogen flow, thereby obtaining 272 g of a solid product with good flowability, which was diethoxy magnesium (yield 96.3%). The prepared diethoxy magnesium had a spherical shape with the average particle diameter of 32 μm, 0.77 of a particle size distribution index, and 0.31 g/cc of a bulk density.

To a 1 L-volume glass reactor equipped with a stirrer, of which atmosphere was sufficiently substituted with nitrogen, 150 ml of toluene and 25 g of diethoxy magnesium prepared above were added and maintained at 10° C. Thereto, 25 ml of titanium tetrachloride which were diluted with 50 ml of toluene were added over 1 hour, and then the temperature of the reactor was elevated to 60° C. at a rate of 0.5° C. per minute. The reaction mixture was maintained at 60° C. for 1 hour. By stopping stirring, the mixture was maintained still, until a solid product was precipitated, so as to remove the supernatant, and then washed the remained mixture once by stirring the mixture again for 15 minutes with the addition of 200 ml of fresh toluene, stopping stirring, allowing it to stand, and removing the supernatant.

To the solid product treated with titanium tetrachloride, 150 ml of toluene were added, and stirred at 250 rpm while maintaining the temperature at 30° C. as well as adding 50 ml of titanium tetrachloride thereto over 1 hour at a constant speed. Completing the addition of titanium tetrachloride, 2.5 ml of diisobutyl phthalate were further added, and the temperature of the reactor was elevated to 110° C. at a constant rate over 80 minutes, i.e. at a rate of 1° C. per minute. While the temperature elevation, at each time the reactor temperature reached to 40° C. and 60° C., 2.5 ml of diisobutyl phthalate were additionally added. The temperature was maintained at 110° C. for 1 hour and lowered to 90° C.; stirring was stopped; the supernatant was removed; and the resulted mixture was washed once by adding 200 ml of toluene additionally with stirring, allowing it to stand, and removing the supernatant. Thereto 150 ml of toluene and 50 ml of titanium tetrachloride were added, the temperature was raised to 110° C., and the temperature was maintained for 1 hour. Said slurry mixture, after completion of the aging process, was washed twice with 200 ml of toluene per each wash, and washed 5 times with 200 ml of n-hexane per each wash at 40° C., thereby obtaining a pale-yellow catalyst. A titanium content of the resulted catalyst dried under a nitrogen stream for 18 hours was 2.75 wt %.

Example 4

Catalyst Preparation

To a 5 L-volume ceramic reactor equipped with a stirrer, an oil heater and a reflux condenser, which was sufficiently purged with nitrogen, 0.96 g of trichloroisocyanuric rid, 15 g of metal magnesium of which average particle diameter is 100 μm (as a powdered product) and 240 ml of anhydrous ethanol were added. The temperature of the reactor was raised to 78° C. so as to maintain the ethanol to be refluxed, while stirring at 240 rpm. After 5 minutes, hydrogen was generated upon start of a reaction, therefore an outlet of the reactor was maintained open so as to exhaust the generated hydrogen, thereby maintaining the pressure inside the reactor as atmospheric pressure. When the hydrogen generation is completed, 15 g of metal magnesium, that is a powder-formed product of which average particle diameter is 100 μm, and 240 ml of ethanol were added by 3 portions every 20 minutes. After completing the addition of said metal magnesium and ethanol, the reactor temperature and stirring rate were maintained as a reflux condition for 2 hours (aging). Finishing the aging process, the resultant was washed three times at 50° C., with 2,000 ml of n-hexane per each washing. The washed product was dried for 24 hours under a nitrogen flow, thereby obtaining 275 g of a solid product with good flowability, which was diethoxy magnesium (yield 97.4%). The prepared diethoxy magnesium had a spherical shape with the average particle diameter of 31 μm, 0.83 of a particle size distribution index, and 0.30 g/cc of a bulk density.

To a 1 L-volume glass reactor equipped with a stirrer, of which atmosphere was sufficiently substituted with nitrogen, 150 ml of toluene and 25 g of diethoxy magnesium prepared above were added and maintained at 10° C. Thereto, 25 ml of titanium tetrachloride which were diluted with 50 ml of toluene were added over 1 hour, and then the temperature of the reactor was elevated to 60° C. at a rate of 0.5° C. per minute. The reaction mixture was maintained at 60° C. for 1 hour. By stopping stirring, the mixture was maintained still, until a solid product was precipitated, so as to remove the supernatant, and then washed the remained mixture once by stirring the mixture again for 15 minutes with the addition of 200 ml of fresh toluene, stopping stirring, allowing it to stand, and removing the supernatant.

To the solid product treated with titanium tetrachloride, 150 ml of toluene were added, and stirred at 250 rpm while maintaining the temperature at 30° C. as well as adding 50 ml of titanium tetrachloride thereto over 1 hour at a constant speed. Completing the addition of titanium tetrachloride, 2.5 ml of diisobutyl phthalate were further added, and the temperature of the reactor was elevated to 110° C. at a constant rate over 80 minutes, i.e. at a rate of 1° C. per minute. While the temperature elevation, at each time the reactor temperature reached to 40° C. and 60° C., 2.5 ml of diisobutyl phthalate were additionally added. The temperature was maintained at 110° C. for 1 hour and lowered to 90° C.; stirring was stopped; the supernatant was removed; and the resulted mixture was washed once by adding 200 ml of toluene additionally with stirring, allowing it to stand, and removing the supernatant. Thereto 150 ml of toluene and 50 ml of titanium tetrachloride were added, the temperature was raised to 110° C., and the temperature was maintained for 1 hour. Said slurry mixture after completion of the aging process was washed twice with 200 ml of toluene per each wash, and washed 5 times with 200 ml of n-hexane per each wash at 40° C., thereby obtaining a pale-yellow catalyst. A titanium content of the resulted catalyst dried under a nitrogen stream for 18 hours was 2.84 wt %.

Example 5

Catalyst Preparation

To a 5 L-volume ceramic reactor equipped with a stirrer, an oil heater and a reflux condenser, which was sufficiently purged with nitrogen, 3.5 g of 1,3-dibromo-5,5-dimethylhydantoin, 15 g of metal magnesium of which average particle diameter is 100 μm (powdered product) and 240 ml of anhydrous ethanol were added. The temperature of the reactor was raised to 78° C. so as to maintain the ethanol to be refluxed, while stirring at 240 rpm. After 5 minutes, hydrogen was generated upon start of a reaction, therefore an outlet of the reactor was maintained open so as to exhaust the generated hydrogen, thereby maintaining the pressure inside the reactor as atmospheric pressure. When the hydrogen generation is completed, 15 g of metal magnesium, that is a powder-formed product of which average particle diameter is 100 μm, and 240 ml of ethanol were added by 3 portions every 20 minutes. After completing the addition of said metal magnesium and ethanol, the reactor temperature and stirring rate were maintained as a reflux condition for 2 hours (aging). Finishing the aging process, the resultant was washed three times at 50° C., with 2,000 ml of n-hexane per each washing. The washed product was dried for 24 hours under a nitrogen flow, thereby obtaining 269 g of a solid product with good flowability, which was diethoxy magnesium (yield 95.3%). The prepared diethoxy magnesium had a spherical shape with the average particle diameter of 35 μm, 0.88 of a particle size distribution index, and 0.32 g/cc of a bulk density.

To a 1 L-volume glass reactor equipped with a stirrer, of which atmosphere was sufficiently substituted with nitrogen, 150 ml of toluene and 25 g of diethoxy magnesium prepared above were added and maintained at 10° C. Thereto, 25 ml of titanium tetrachloride which were diluted with 50 ml of toluene were added over 1 hour, and then the temperature of the reactor was elevated to 60° C. at a rate of 0.5° C. per minute. The reaction mixture was maintained at 60° C. for 1 hour. By stopping stirring, the mixture was maintained still, until a solid product was precipitated, so as to remove the supernatant, and then washed the remained mixture once by stirring the mixture again for 15 minutes with the addition of 200 ml of fresh toluene, stopping stirring, allowing it to stand, and removing the supernatant.

To the solid product treated with titanium tetrachloride, 150 ml of toluene were added, and stirred at 250 rpm while maintaining the temperature at 30° C. as well as adding 50 ml of titanium tetrachloride thereto over 1 hour at a constant speed. Completing the addition of titanium tetrachloride, 2.5 ml of diisobutyl phthalate were further added, and the temperature of the reactor was elevated to 110° C. at a constant rate over 80 minutes, i.e. at a rate of 1° C. per minute. While the temperature elevation, at each time the reactor temperature reached to 40° C. and 60° C., 2.5 ml of diisobutyl phthalate were additionally added. The temperature was maintained at 110° C. for 1 hour and lowered to 90° C.; stirring was stopped; the supernatant was removed; and the resulted mixture was washed once by adding 200 ml of toluene additionally with stirring, allowing it to stand, and removing the supernatant. Thereto 150 ml of toluene and 50 ml of titanium tetrachloride were added, the temperature was raised to 110° C., and the temperature was maintained for 1 hour. Said slurry mixture after completion of the aging process was washed twice with 200 ml of toluene per each wash, and washed 5 times with 200 ml of n-hexane per each wash at 40° C., thereby obtaining a pale-yellow catalyst. A titanium content of the resulted catalyst dried under a nitrogen stream for 18 hours was 2.76 wt %.

Example 6

Catalyst Preparation

To a 5 L-volume ceramic reactor equipped with a stirrer, an oil heater and a reflux condenser, which was sufficiently purged with nitrogen, 3.2 g of $MgBr_2$, 15 g of metal magnesium of which average particle diameter is 100 μm (as a powdered product) and 240 ml of anhydrous ethanol were added. The temperature of the reactor was raised to 78° C. so as to maintain the ethanol to be refluxed, while stirring at 240 rpm. After 5 minutes, hydrogen was generated upon start of a reaction, therefore an outlet of the reactor was maintained open so as to exhaust the generated hydrogen, thereby maintaining the pressure inside the reactor as atmospheric pressure. When the hydrogen generation is completed, 15 g of metal magnesium, that is a powder-formed product of which average particle diameter is 100 μm, and 240 ml of ethanol were added by 3 portions every 20 minutes. After completing the addition of said metal magnesium and ethanol, the reactor temperature and stirring rate were maintained as a reflux condition for 2 hours (aging). Finishing the aging process, the resultant was washed three times at 50° C., with 2,000 ml of n-hexane per each washing. The washed product was dried for 24 hours under a nitrogen flow, thereby obtaining 272 g of a solid product with good flowability, which was diethoxy magnesium (yield 96.5%). The prepared diethoxy magnesium had a spherical shape with the average particle diameter of 30 μm, 0.86 of a particle size distribution index, and 0.31 g/cc of a bulk density.

To a 1 L-volume glass reactor equipped with a stirrer, of which atmosphere was sufficiently substituted with nitrogen, 150 ml of toluene and 25 g of diethoxy magnesium prepared above were added and maintained at 10° C. Thereto, 25 ml of titanium tetrachloride which were diluted with 50 ml of toluene were added over 1 hour, and then the temperature of the reactor was elevated to 60° C. at a rate of 0.5° C. per minute. The reaction mixture was maintained at 60° C. for 1 hour. By stopping stirring, the mixture was maintained still, until a solid product was precipitated, so as to remove the supernatant, and then washed the remained mixture once by stirring the mixture again for 15 minutes with the addition of 200 ml of fresh toluene, stopping stirring, allowing it to stand, and removing the supernatant.

To the solid product treated with titanium tetrachloride, 150 ml of toluene were added, and stirred at 250 rpm while maintaining the temperature at 30° C. as well as adding 50 ml of titanium tetrachloride thereto over 1 hour at a constant speed. Completing the addition of titanium tetrachloride, 2.5 ml of diisobutyl phthalate were further added, and the temperature of the reactor was elevated to 110° C. at a constant rate over 80 minutes, i.e. at a rate of 1° C. per minute. While the temperature elevation, at each time the reactor temperature reached to 40° C. and 60° C., 2.5 ml of diisobutyl phthalate were additionally added. The temperature was maintained at 110° C. for 1 hour and lowered to 90° C.; stirring was stopped; the supernatant was removed; and the resulted mixture was washed once by adding 200 ml of toluene additionally with stirring, allowing it to stand, and removing the supernatant. Thereto 150 ml of toluene and 50 ml of titanium tetrachloride were added, the temperature was raised to 110° C., and the temperature was maintained for 1 hour. Said slurry mixture after completion of the aging was washed twice with 200 ml of toluene per each wash, and washed 5 times with 200 ml of n-hexane per each wash at 40° C., thereby obtaining a pale-yellow catalyst. A titanium content of the resulted catalyst dried under a nitrogen stream for 18 hours was 2.79 wt %.

Comparative Example 1

Catalyst Preparation

To a 1 L-volume glass reactor equipped with a stirrer, of which atmosphere was sufficiently substituted with nitrogen, 100 ml of decane, 82 g of 2-ethylhexyl alcohol and 20 g of dichloromagnesium were added, and the temperature was maintained at 130° C. for 2 hours. 4.5 g of anhydrous phthalic acid were added to the above solution, and the resulted mixture was stirred for 1 hour so as to obtain a uniformly mixed solution. Cooling the solution to room temperature, 15.8 ml of thus obtained uniform solution were added dropwise to 42 ml of titanium tetrachloride. Raising the temperature of the resulted mixture to 110° C., 1.1 g of isobutyl phthalic acid was added thereto with stirring for 2 hours so as to allow a reaction. Completing the reaction, the resulted mixture was suspended to 58 ml of titanium tetrachloride and allowed to react at 110° C. for 2 hours. Thereafter, the reaction mixture was washed 7 times with heptane at 40° C. to obtain a black catalyst. A titanium content of the resulted catalyst dried under a nitrogen stream for 18 hours was 2.81 wt %.

[Propylene Polymerization]

Into a 2 L stainless autoclave, a small glass tube charged with 5 mg of the above-prepared catalyst was placed, and the atmosphere of the autoclave was sufficiently substituted by nitrogen. 3 mmol of triethyl aluminum were added thereto along with 0.15 mmol of cyclohexylmethyldimethoxy silane. Subsequently, 1000 ml of hydrogen and 1.2 L of liquid propylene were added in this order, and the temperature was elevated to 70° C. By operating a stirrer, the glass tube installed in the autoclave was broken so as to start polymerization. When 1 hour elapses after the start of polymerization, a valve was opened, while lowering the temperature of the autoclave to room temperature, thereby completely eliminating the propylene from the autoclave.

The resulted polymer was assayed and the results were summarized in the following Table 1.

Catalyst activity, stereoregularity, melt flow index and bulk density were determined by the following method:

① Catalyst activity (kg-PP/g-cat)=amount of polymers produced (kg)÷amount of catalyst (g)

② Stereoregularity (X.I.): insolubles (wt %) which were crystallized in mixed xylene ③ Melt Flow Index (MFR): measured at 230° C. under the load of 2.16 kg, according to ASTM1238

④ Bulk density(BD)=value measured by ASTM D1895

TABLE 1

|  | Activity (kg-PP/g-cat) | Stereo-regularity (X.I.) | Melt flow index (MFR) | Bulk density (BD) |
|---|---|---|---|---|
| Example 1 | 47.4 | 98.5 | 2.2 | 0.42 |
| Example 2 | 48.9 | 98.4 | 3.5 | 0.43 |
| Example 3 | 54.7 | 98.3 | 2.6 | 0.44 |
| Example 4 | 50.6 | 98.3 | 2.8 | 0.43 |
| Example 5 | 52.3 | 98.2 | 3.3 | 0.43 |
| Example 6 | 51.5 | 98.5 | 3.1 | 0.44 |
| Comparative ex. 1 | 28.1 | 97.4 | 2.9 | 0.42 |

INDUSTRIAL APPLICABILITY

As is shown in Table 1, when using a mixture of a catalyst for propylene polymerization of the present invention, alkyl aluminum and an external electron donor in propylene polymerization, it is possible to prepare polypropylene in high yield, with very high stereoregularity, polymerization activity which is almost twice as high as that of a conventional catalyst, and a bulk density equal or higher than that of a compared catalyst, wherein the bulk density, generally, greatly affects to the commercial productivity.

The invention claimed is:

1. A method for preparing a catalyst for propylene polymerization, wherein the method comprises:

obtaining a dialkoxy magnesium carrier by reacting metal magnesium with 5-50 parts by weight of an alcohol, based on 1 part by weight of metal magnesium, at 60-110° C. in the presence of 0.001-0.2 parts by weight of a nitrogen-based halogen compound as a reaction initiator, based on 1 part by weight of metal magnesium, selected from the following (1)-(4):

(1) N-halide succinimides represented by the general formula

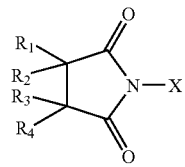

wherein, X is a halogen atom, and $R_1$, $R_2$, $R_3$ and $R_4$ are independently hydrogen, or $C_{1-12}$ alkyl or $C_{1-12}$ aryl;

(2) trihaloisocyanuric acid compounds represented by the general formula

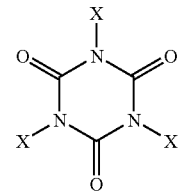

wherein, X is a halogen atom;

(3) N-halophthalimide compounds represented by the general formula

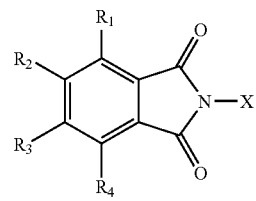

wherein, X is a halogen atom, and $R_1$, $R_2$, $R_3$ and $R_4$ are independently, hydrogen, or $C_{1-12}$ alkyl or $C_{1-12}$ aryl; and (4) hydantoin compounds represented by the general formula

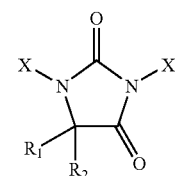

wherein, X is a halogen atom, and $R_1$ and $R_2$ are independently hydrogen, or $C_{1-12}$ alkyl or $C_{1-12}$ aryl;

reacting the above obtained dialkoxy magnesium carrier with titanium tetrachloride; and reacting the resultant product with titanium tetrachloride and an internal electron donor.

2. The method according to claim 1, wherein the average particle diameter of the metal magnesium is 10-300 μm.

3. The method according to claim 1, wherein the alcohol is one or more selected from aliphatic alcohols represented by ROH, wherein R is a C1-6 alkyl group, and aromatic alcohols.

4. The method according to claim 1, wherein the internal electron donor is one or more selected from phthalic acid diesters and derivatives thereof, and benzoates and derivatives thereof.

* * * * *

UNITED STATES PATENT AND TRADEMARK OFFICE
CERTIFICATE OF CORRECTION

PATENT NO.      : 8,435,913 B2                                              Page 1 of 1
APPLICATION NO. : 12/532888
DATED           : May 7, 2013
INVENTOR(S)     : Kim et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 154 days.

Signed and Sealed this
Eighth Day of September, 2015

Michelle K. Lee
*Director of the United States Patent and Trademark Office*